(12) United States Patent
Wu et al.

(10) Patent No.: US 11,977,260 B2
(45) Date of Patent: May 7, 2024

(54) OPTICAL-FIBER CONNECTOR

(71) Applicant: ACON OPTICS COMMUNICATIONS INC., New Taipei (TW)

(72) Inventors: Jia-Rong Wu, New Taipei (TW); Tsung-Yao Hsu, New Taipei (TW)

( * ) Notice: Subject to any disclaimer, the term of this patent is extended or adjusted under 35 U.S.C. 154(b) by 43 days.

(21) Appl. No.: 17/808,708

(22) Filed: Jun. 24, 2022

(65) Prior Publication Data
US 2023/0418000 A1    Dec. 28, 2023

(51) Int. Cl.
*G02B 6/00* (2006.01)
*G02B 6/38* (2006.01)

(52) U.S. Cl.
CPC ......... *G02B 6/3825* (2013.01); *G02B 6/3879* (2013.01); *G02B 6/3897* (2013.01)

(58) Field of Classification Search
CPC .. G02B 6/3825; G02B 6/3879; G02B 6/3897; G02B 6/00
See application file for complete search history.

(56) References Cited

U.S. PATENT DOCUMENTS

| | | | |
|---|---|---|---|
| 6,357,934 B1 | 3/2002 | Driscoll et al. | |
| 2015/0338581 A1* | 11/2015 | Hikosaka | G02B 6/3888 385/83 |
| 2019/0129103 A1 | 5/2019 | Rossi | |
| 2021/0399488 A1* | 12/2021 | Song | H01R 13/6591 |

FOREIGN PATENT DOCUMENTS

| | | |
|---|---|---|
| CH | 705532 A2 | 3/2013 |
| CN | 216214454 U | 4/2022 |

* cited by examiner

*Primary Examiner* — Jennifer Doan
(74) *Attorney, Agent, or Firm* — INNOVATION CAPITAL LAW GROUP, LLP; Vic Lin

(57) ABSTRACT

An optical-fiber connector includes a coupling member, a core component, a sleeve member, a metal retaining member, and a pressing member. The core component is in the receiving space. The metal retaining member is connected to one of two ends of the coupling member. The elastic arm of the metal retaining member inclinedly extends toward the other end of the coupling member. Two sides of the elastic arm have a plurality of retaining structures. The sleeve member is at the other end of the coupling member and is connected to the pressing member. The pressing portion of the pressing member extends toward the elastic arm. The metal retaining member is adapted to be buckled with an adapter, so that the service life of the optical-fiber connector can be prolonged.

11 Claims, 11 Drawing Sheets

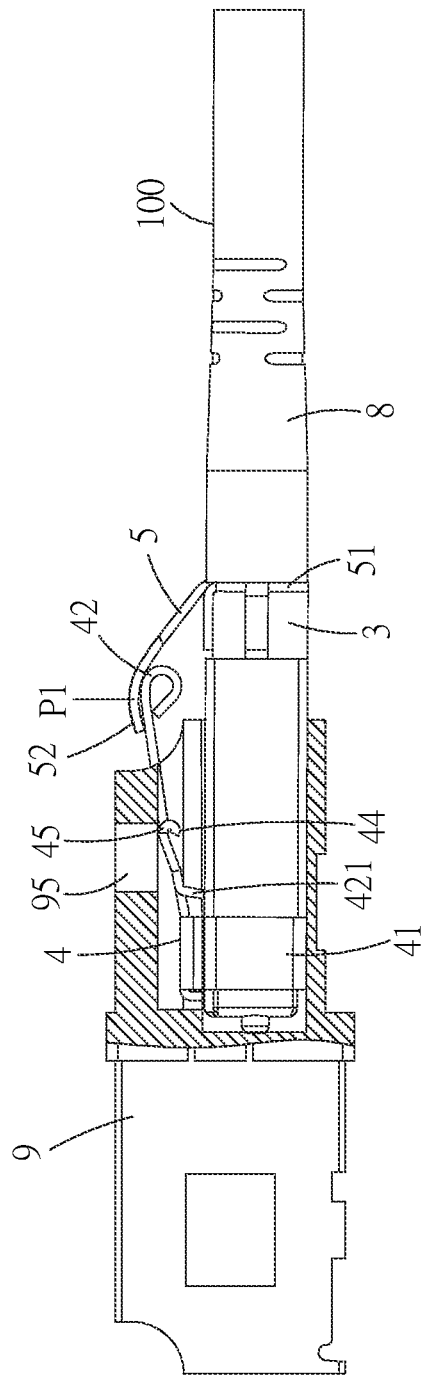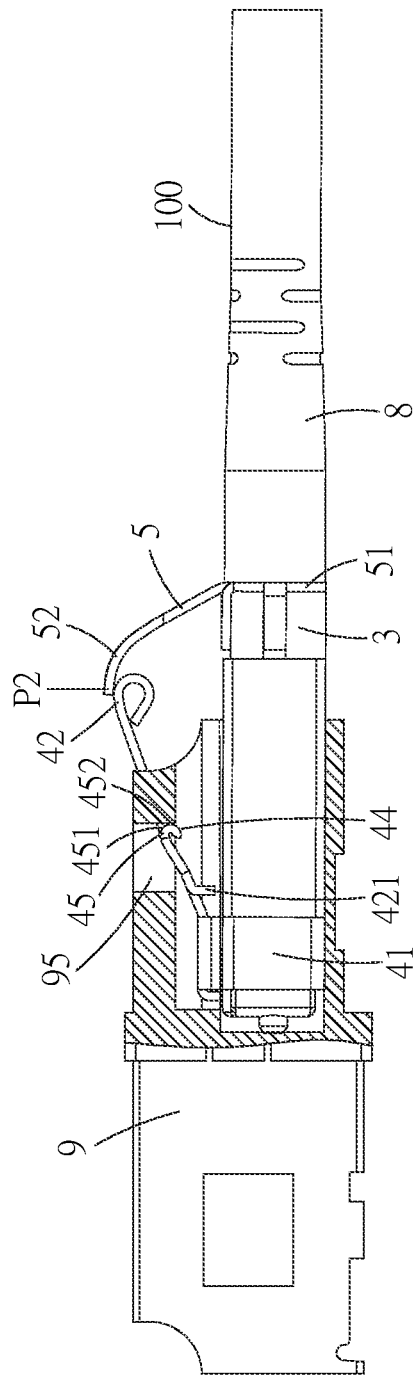

OPTICAL-FIBER CONNECTOR

FIELD OF THE INVENTION

The instant disclosure relates to a connector, and more particular to an optical-fiber connector.

BACKGROUND

The optical fiber is an tool for optical transmission. An optical-fiber connector is used for connecting the optical fiber with different electronic devices, so that the electronic devices can utilize the signals transmitted by the optical fiber. An optical-fiber connector assembly known to the inventor includes an adapter and a male optical-fiber connector. The adapter is assembled to the electronic device. Hence, when the male optical-fiber connector is inserted into the adapter, the male optical-fiber is fixed with the adapter and signals can be transmitted to the electronic device through the optical-fiber connector assembly. Owing that the size of the optical-fiber connectors is small, the optical-fiber connectors are widely applied in optical communication network, data network, or cable TV network.

Please refer to FIG. 1 and FIG. 2. FIG. 1 illustrates a perspective view of an optical-fiber connector A known to the inventor, and FIG. 2 illustrates a lateral view showing that the optical-fiber connector A known to the inventor is mated with an adapter B. The male optical-fiber connector A known to the inventor has a housing A1 and an elastic arm A2 on the housing A1. The elastic arm A2 outwardly and inclinedly extends from a top portion of the housing A1. Two stopping blocks A21 are integrally formed on two sides of the elastic arm A2. The stopping blocks A21 are selectively engaged with or detached off a buckling hole B1 of the adapter B. However, because the elastic arm A2 and the stopping blocks A21 are of a one-piece member and made of plastic, the elastic arm A2 is prone to be broken upon being bent when the optical-fiber connector A is mating with the adapter B.

SUMMARY OF THE INVENTION

In view of these, an embodiment of the instant disclosure provides an optical-fiber connector comprising a coupling member, a core component, a sleeve member, a metal retaining member, and a pressing member. The coupling member has a receiving space and a plurality of openings. The openings are at two ends of the coupling member and in communication with the receiving space. The core component is in the receiving space. The sleeve member is connected to one of the openings. The metal retaining member has a frame body. The frame body is connected to one of the two ends of the coupling member. The metal retaining member comprises an elastic arm inclinedly extending toward the other end of the coupling member from the frame body. Two sides of the elastic arm have a plurality of retaining structures. The pressing member has a mating portion and a pressing portion. The mating portion is fitted over the sleeve member. The pressing portion extends toward the elastic arm from the mating portion. In some embodiments, the retaining structures extend outwardly from the two sides of the elastic arm, and each of the retaining structures is adapted to contact an inner wall of a corresponding one of two connection slots inside an adapter in a surface-contact manner.

In some embodiments, each of the retaining structures has an arced protrusion, and an outer arced surface of each of the arced protrusions is adapted to contact an inner wall of a corresponding one of two connection slots inside an adapter in a line-contact manner.

In some embodiments, each of the two sides of the elastic arm has a limiting portion adjacent to an outer wall of the coupling member. When the pressing portion of the pressing member is at a pressing position, each of the limiting portions leans against the outer wall of the coupling member.

In some embodiments, the pressing member has a plurality of friction portions adapted to be contacted by a hand, the friction portions are on the pressing portion, the pressing portion contacts a top portion of the elastic arm, and the pressing member has an extension portion between the pressing portion and the mating portion.

In some embodiments, the frame body has a plurality of buckling portions and a fixation block, an outer wall of the coupling member has a plurality of engaging portions, each of the buckling portions is buckled with a corresponding one of the engaging portions, and the fixation block is limited at the outer wall of the coupling member.

In some embodiments, each of two sides of the frame body has a recessed portion, and each of the recessed portions corresponds to a protrusion on a corresponding one of two inner sides of an adapter.

In some embodiments, the pressing member has a fixation block, the fixation block is on the mating portion, an outer wall of the sleeve member has a fixation slot, and the fixation slot is buckled with the fixation slot.

In some embodiments, the pressing member has a buckling portion, the buckling portion is on the mating portion, an outer wall of the sleeve member has an engaging portion, and the buckling portion is buckled with the engaging portion.

In some embodiments, the mating portion has a buckling hole, each of two sides of an inner wall of the buckling hole has a limiting portion, each of two sides of the sleeve member has a positioning portion, and each of the limiting portions is connected to a corresponding one of the positioning portions.

In some embodiments, the coupling member has a connection portion at an inner wall of the receiving space and adjacent to one of the openings, the sleeve member has a joint portion, and the connection portion is connected to the joint portion.

According to some embodiments of the instant disclosure, the optical-fiber connector is buckled with the adapter through the metal retaining member which is made of metal, thereby prolonging the service life of the optical-fiber connector. Moreover, according to some embodiments, the two sides of the elastic arm of the metal retaining member have the arced protrusion, thus increasing the structural strength of the metal retaining member. Furthermore, according to some embodiments, a limiting portion is on the elastic arm to prevent the elastic arm from being pressed excessively and deformed.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein:

FIG. 9 illustrates a schematic lateral view showing that the optical-fiber connector is mating with the adapter according to some embodiments of the instant disclosure;

FIG. 10 illustrates a schematic lateral view showing that the optical-fiber connector is mated with the adapter according to some embodiments of the instant disclosure;

DETAILED DESCRIPTION

Figure 1:
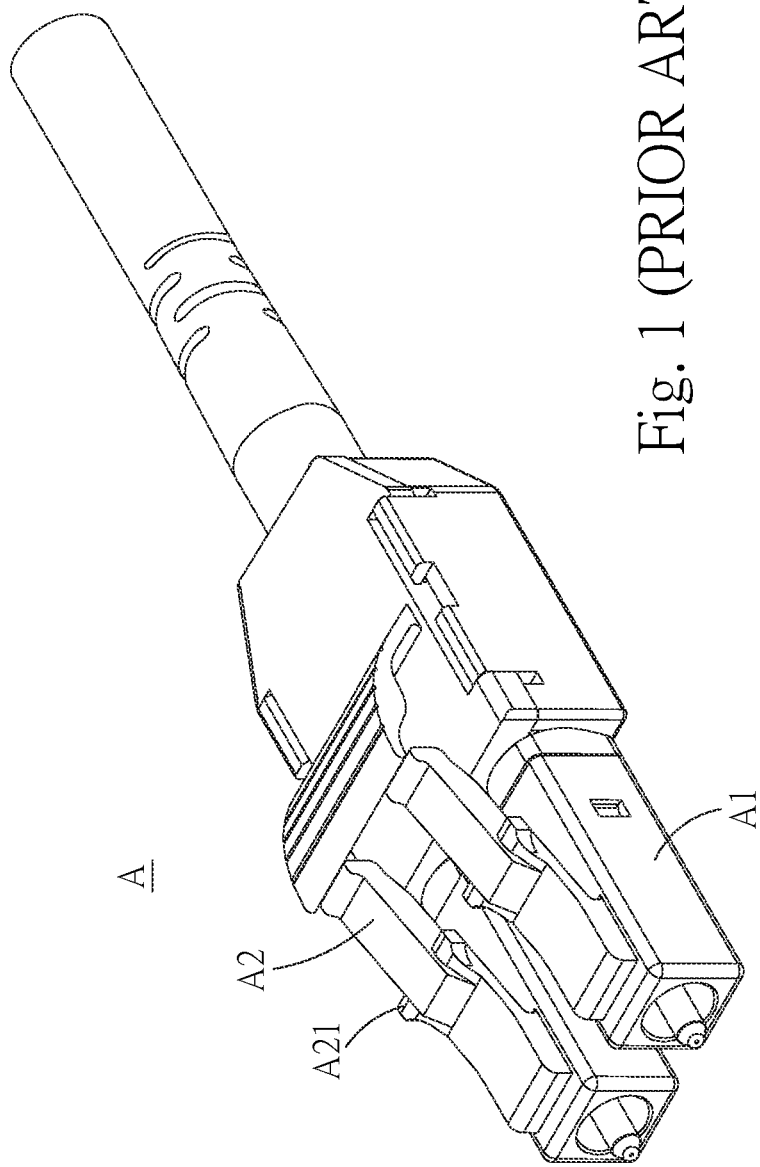
FIG. 1 illustrates a perspective view of an optical-fiber connector known to the inventor.
Figure 2:
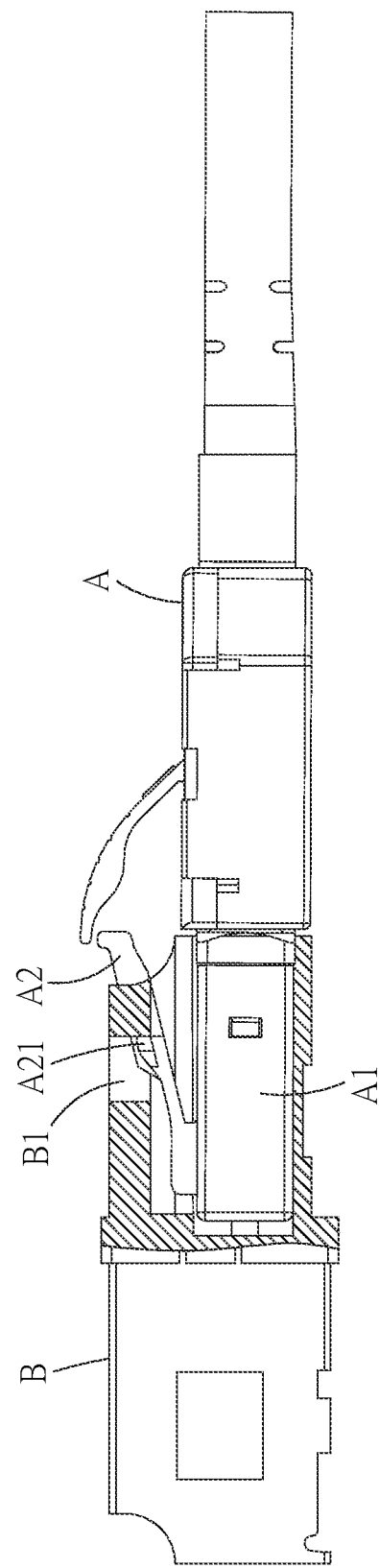
FIG. 2 illustrates a lateral view showing that the optical-fiber connector known to the inventor is mated with an adapter.
Figure 3:
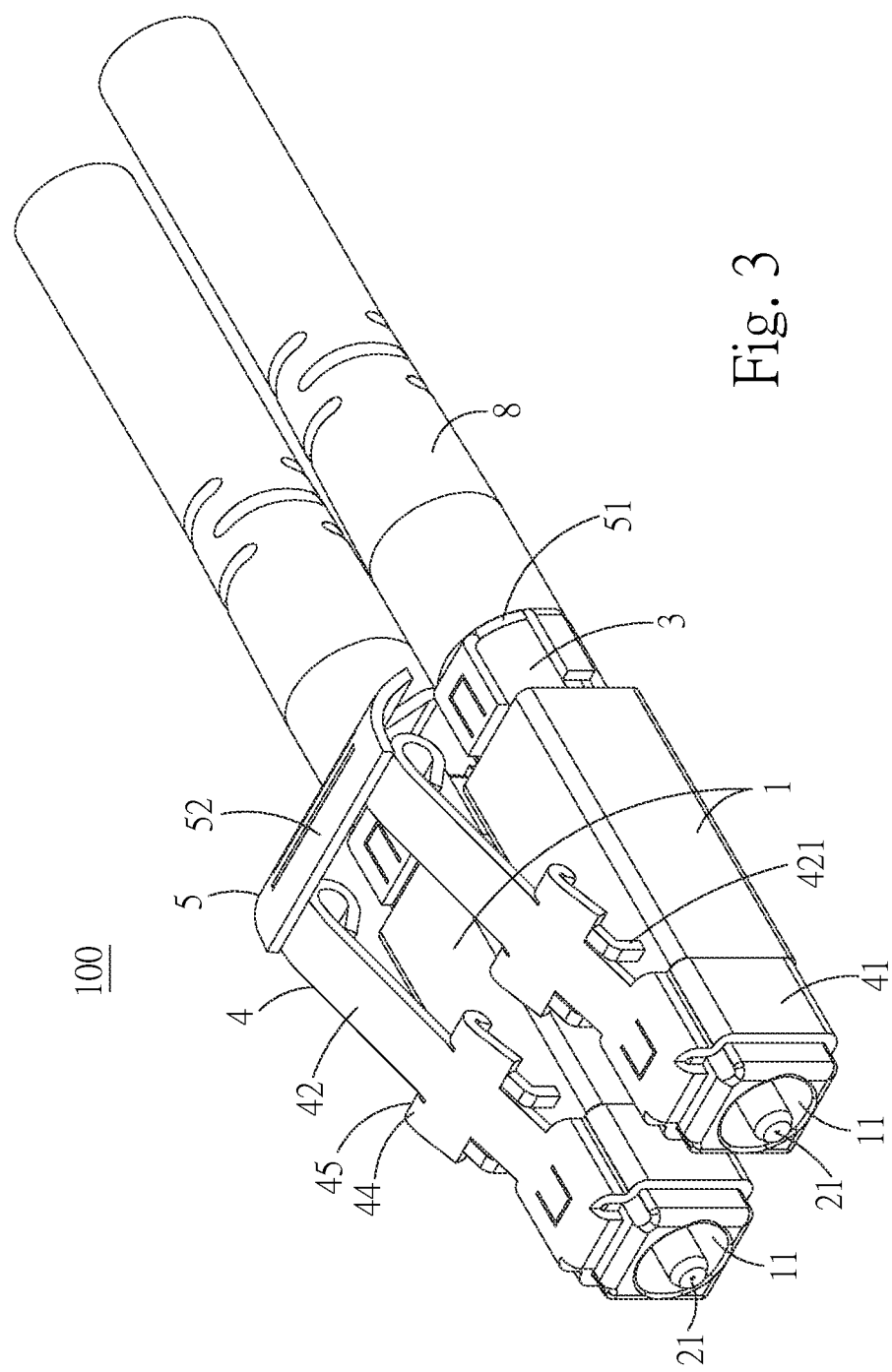
FIG. 3 illustrates a perspective view of an optical-fiber connector according to some embodiments of the instant disclosure.
Figure 4:
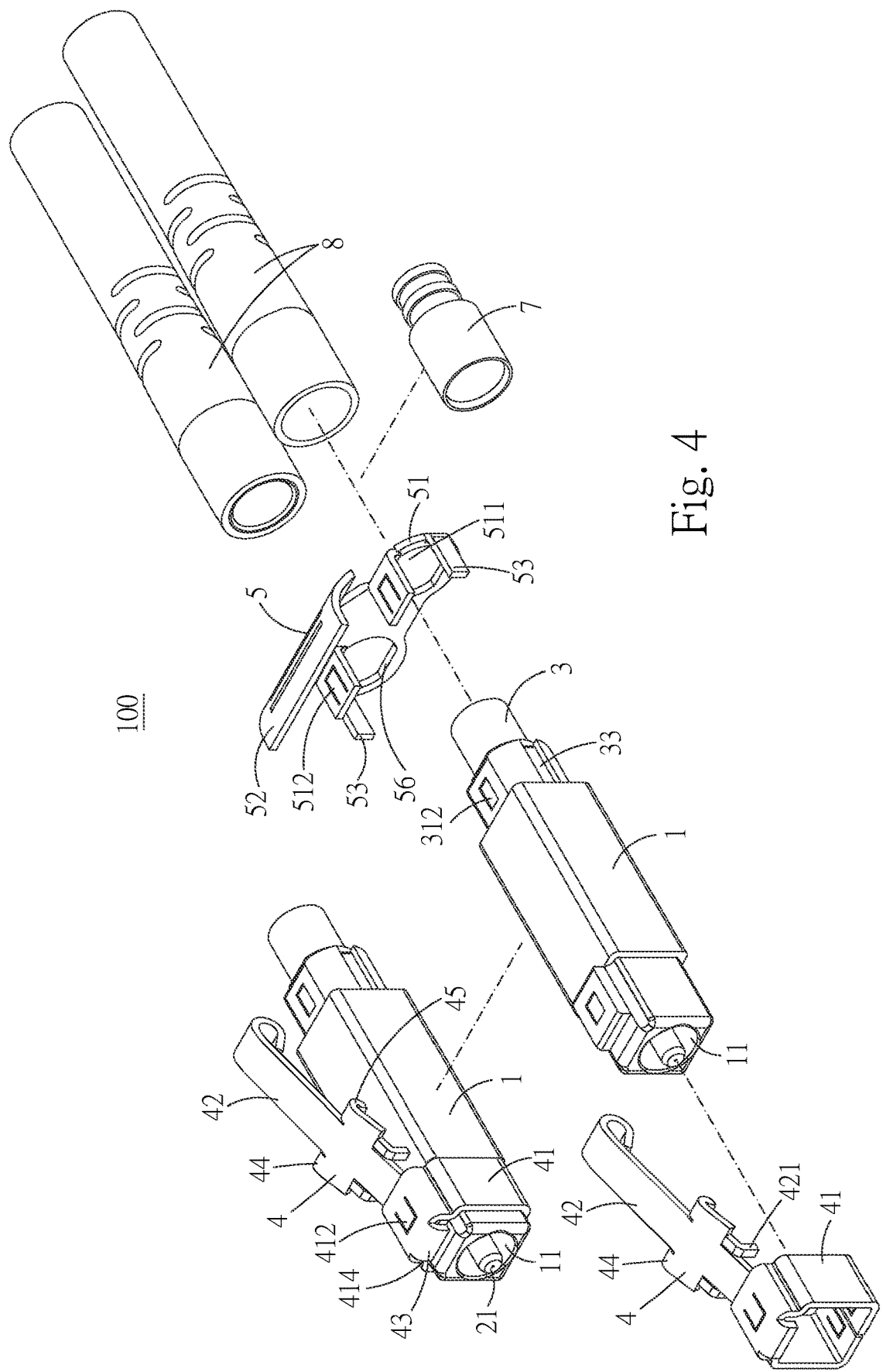
FIG. 4 illustrates a front exploded view of the optical-fiber connector according to some embodiments of the instant disclosure, where the core component is not detached off.

Please refer to FIG. 3. FIG. 3 illustrates a perspective view of an optical-fiber connector 100. In some embodiments, the optical-fiber connector 100 is adapted to be utilized in electrocommunication, interior wiring, industrial, military, aerospace, or medical devices. For example, upon applying the optical-fiber connector 100 in the aerospace field, the components of the airplane are connected with each other through the optical-fiber connector 100. In some embodiments, the optical-fiber connector 100 comprises a coupling member 1, a core component 2, a sleeve member 3, a metal retaining member 4, and a pressing member 5 (as shown in FIG. 4).

Figure 5:
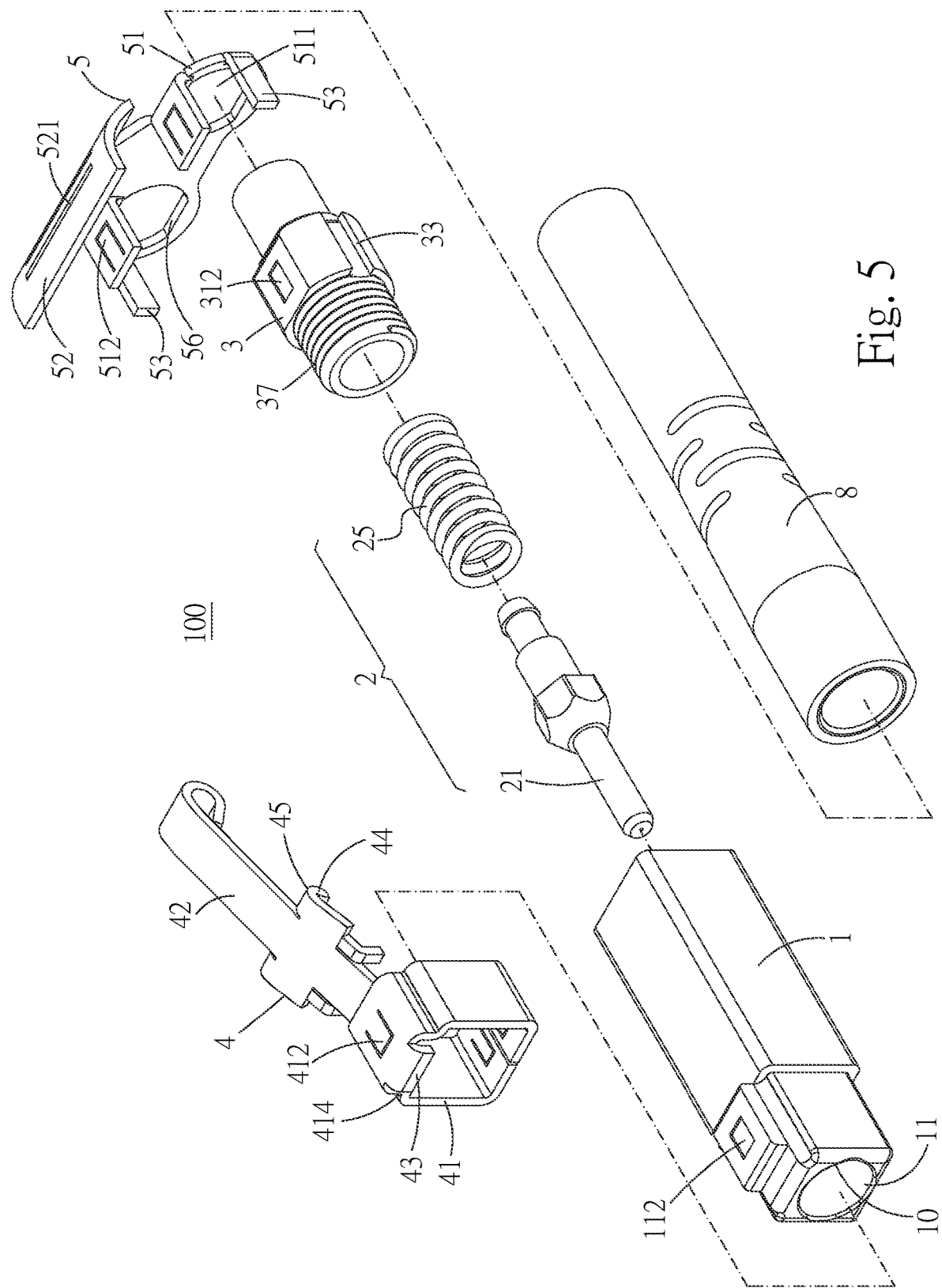
FIG. 5 illustrates a front exploded view of the optical-fiber connector according to some embodiments of the instant disclosure, where the core component is detached off.
Figure 6:
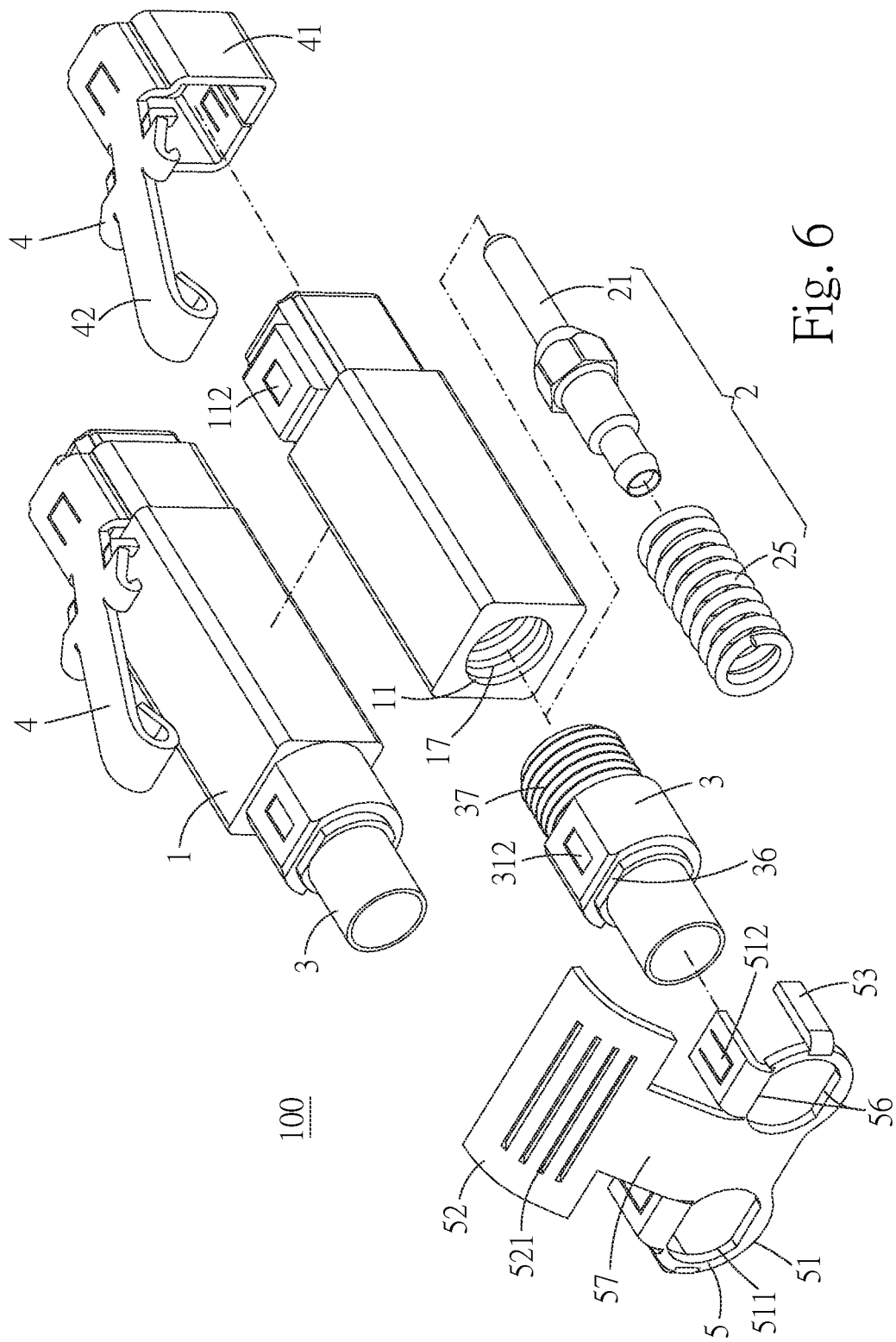
FIG. 6 illustrates a rear exploded view of the optical-fiber connector according to some embodiments of the instant disclosure, where the core component is detached off.

The coupling member 1 has a receiving space 10 (as shown in FIG. 5) and a plurality of openings 11. The openings 11 are at two ends of the coupling member 1 and in communication with the receiving space 10 (as shown in FIG. 5 and FIG. 6). The core component 2 is in the receiving space 10. The sleeve member 3 is connected to one of the openings 11. The metal retaining member 4 has a frame body 41 connected to one of the two ends of the coupling member 1. The metal retaining member 4 comprises an elastic arm 42 inclinedly extending toward the other end of the coupling member 1 from the frame body 41. Two sides of the elastic arm 42 have a plurality of retaining structures 44. The pressing member 5 has a mating portion 51 and a pressing portion 52. The mating portion 51 is fitted over the sleeve member 3. The pressing portion 52 extends toward the elastic arm 42 from the mating portion 51.

According to some embodiments, when the coupling member 1 is assembled with the metal retaining member 4, the optical-fiber connector 100 can be mated with an adapter 9 through the metal retaining member 4 which is completely made of metal (as shown in FIG. 9). The metal retaining member 4 is rigid and not fragile, thus prolonging the service life of the optical-fiber connector 100. Moreover, the metal retaining member 4 has high and low temperatures resistance.

Figure 11:
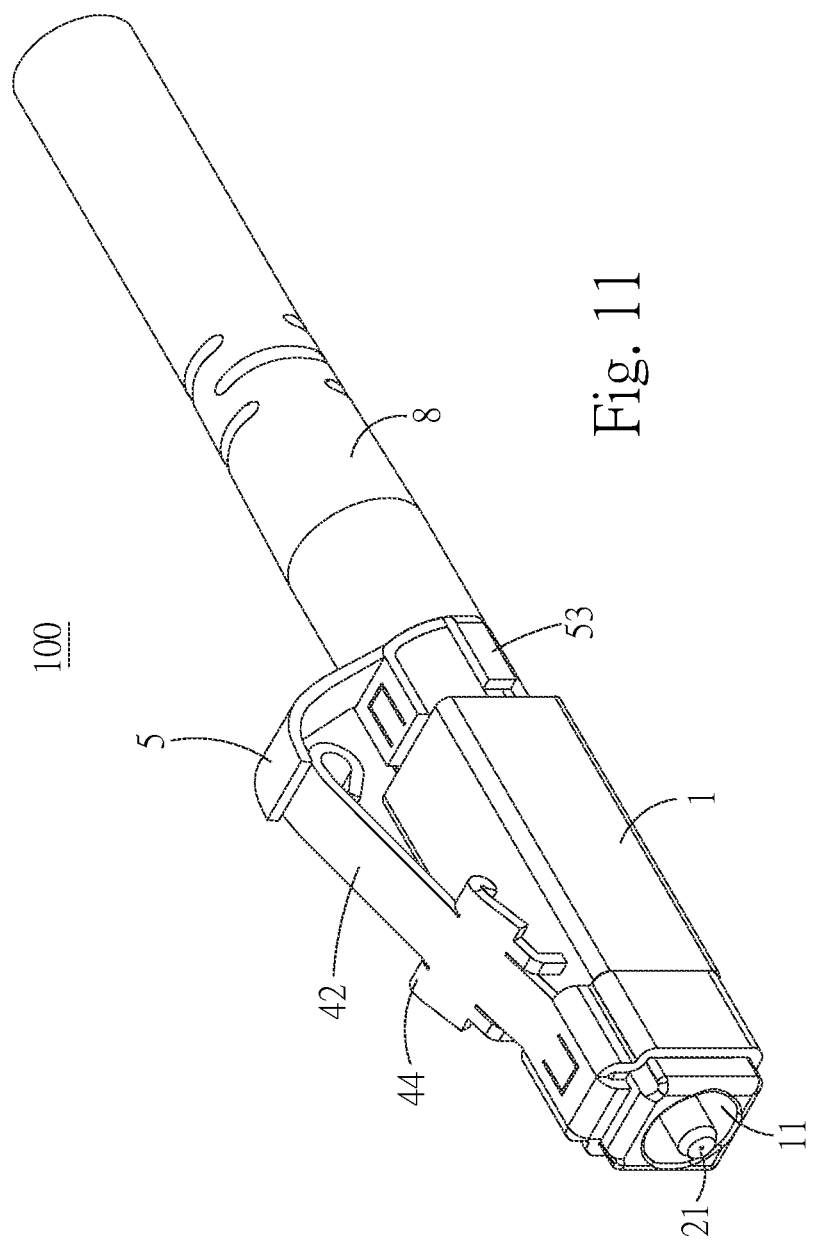
FIG. 11 illustrates a perspective view of a single optical-fiber connector according to some embodiments of the instant disclosure.

In some embodiments, the optical-fiber connector 100 comprises two coupling members 1 (as shown in FIG. 3), but embodiments are not limited thereto; in one embodiment, the optical-fiber connector 100 comprises a single coupling member 1 (as shown in FIG. 11) or comprises three or more coupling members 1. According to some embodiments, in the optical-fiber connector 100, two coupling members 1 are correspondingly mated with one pressing member 5, but embodiments are not limited thereto; according to some embodiments, in the optical-fiber connector 100, one coupling member 1 is mated with one pressing member 5, or three or more coupling members 1 are correspondingly mated with one pressing member 5.

Please refer to FIG. 3. In some embodiments, the two coupling members 1 are respectively assembled with two core components 2, so that an optical-fiber connector 100 with a dual-core configuration is provided, thereby having the advantages of reduced wiring spaces.

Please refer to FIG. 3. In some embodiments, the optical-fiber connector 100 comprises two coupling members 1. The coupling members 1 are side-by-side arranged with each other. Each of the coupling members 1 is a rectangular structure. A gap is between the coupling members 1.

Please refer to FIG. 5 and FIG. 6. FIG. 5 illustrates a front exploded view of the optical-fiber connector 100, where the core component 2 is detached off. FIG. 6 illustrates a rear exploded view of the optical-fiber connector 100, where the core component 2 is detached off. In some embodiments, the core component 2 is in the coupling member 1. The core component 2 comprises an insertion pin 21 and a spring 25. The insertion pin 21 is at one of the openings 11. The insertion pin 21 is connected to a core member. The core member is made of a ceramic material for enclosing optical fiber cables, and the optical fiber cables are aligned with the core hole of the core member. The insertion pin 21 is at one of two ends of the core member. The sleeve member 3 is made of a metal material. One of two ends of the sleeve member 3 is fitted over the other end of the core member, and the other end of the sleeve member 3 is connected to a compressible member 7 (as shown in FIG. 4). The compressible member 7 is connected to a tail cap 8. The tail cap 8 is fitted over the transmission cable as a cover. The compressible member 7 is provided for increasing the assembling force between the optical-fiber connector 100 and the cover of the cable. Therefore, when a user pulls the cable with an excessive force, the optical-fiber connector 100 can be prevented from being detached off the cover of the cable easily. The sleeve member 3 is assembled at the rear end of the coupling member 1. The spring 25 is fitted over the other end of the core member, and the spring 25 is received in the sleeve member 3. One of two ends of the spring 25 abuts against the core member, and the other end of the spring 25 abuts against the sleeve member 3. The spring 25 allows the core member to have a buffering effect upon being forced.

Please refer to FIG. 5 and FIG. 6. In some embodiments, the mating portion 51 of the pressing member 5 is a circular ring. The mating portion 51 has a buckling hole 511. Each of two sides of an inner wall of the buckling hole 511 has a limiting portion 56. Each of two sides of the sleeve member 4 has a positioning portion 36. Each of the limiting portions 56 is connected to a corresponding one of the positioning portions 36. In some embodiments, the limiting portions 56 and the positioning portions 36 are flat structures corresponding to each other, so that the rotation of the sleeve member 3 with respect to the mating portion 51 can be prevented.

Please refer to FIG. 5 and FIG. 6. In some embodiments, the pressing portion 52 of the pressing member 5 is an arced elastic piece. The arced elastic piece is integrally formed with the mating portion 51, and the arced elastic piece extends to a top portion of the elastic arm 42 from a top portion of the mating portion 51.

Please refer to FIG. 6. In some embodiments, the pressing member 5 has a plurality of friction portions 521 adapted to be contacted by a hand. The friction portions 521 are on the pressing portion 52, and the pressing portion 52 contacts the top portion of the elastic arm 42. The friction portions 521 increase the friction force between the hand and the pressing portion 52, thereby increasing the operation feeling upon the user's hand pressing the pressing member 5.

Please refer to FIG. 5 and FIG. 6. In some embodiments, the frame body 41 has a plurality of buckling portions 412 and a fixation block 43. The buckling portions 412 are protruding blocks at the inner surface of the frame body 41. An outer wall of the coupling member 1 has a plurality of engaging portions 112. The engaging portions 112 are recesses at the outer wall of the coupling member 1. Each of the buckling portions 412 is buckled with a corresponding one of the engaging portions 112. The fixation block 43 is limited at the outer wall of the coupling member 1. The fixation block 43 is a bent structure at the front end of the frame body 41. The fixation block 43 leans against the front end of the coupling member 1 to limit the movement of the coupling member 1. Therefore, through the fixation block 43, the frame body 41 can be prevented from being detached off the coupling member 1.

Please refer to FIG. 5 and FIG. 6. In some embodiments, the pressing member 5 has a fixation block 53. The fixation block 53 is on the mating portion 51. An outer wall of the sleeve member 3 has a fixation slot 33. The fixation block 53 is buckled with the fixation slot 33 to increase the structural strength of the optical-fiber connector 100. The fixation block 53 is a bent structure at a side portion of the mating portion 51. The fixation block 53 is limited in the fixation slot 33 to limit the movement of the pressing member 5 with respect to the sleeve member 3, so that the structural strength of the optical-fiber connector 100 can be increased.

Please refer to FIG. 5 and FIG. 6. In some embodiments, the pressing member has a buckling portion 512. The buckling portion 512 is on the mating portion 51. The outer wall of the sleeve member 3 has an engaging portion 312. The buckling portion 512 is a protruding block at the inner surface of the mating portion 51. The engaging portion 312 is a recess at the outer wall of the sleeve member 3. The buckling portion 512 is buckled with the engaging portion 312 to limit the movement of the pressing member 5 with respect to the sleeve member 3.

Please refer to FIG. 6. In some embodiments, the coupling member 1 has a connection portion 17. The connection portion 17 is at an inner wall of the receiving space 10 and adjacent to one of the openings 11. The sleeve portion 3 has a joint portion 37, and the connection portion 17 is connected to the joint portion 37. In some embodiments, the connection portion 17 is a female thread, the joint portion 37 is a male thread, and the inner thread is threaded with the outer thread, but embodiments are not limited thereto. In some embodiments, the connection portion 17 and the joint portion 37 may be convex and concave structures mated with each other, or the connection portion 17 and the joint portion 37 may be mated with each other through an interference-fitting manner.

Figure 7:
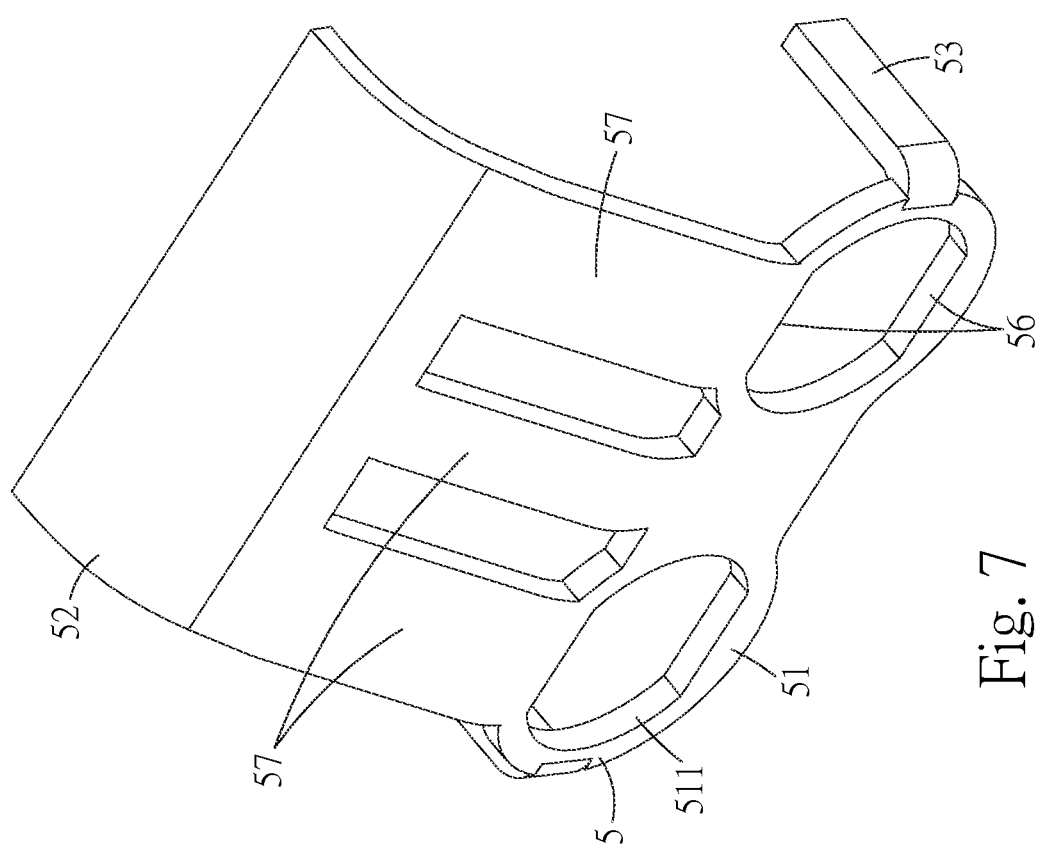
FIG. 7 illustrates a perspective view of another pressing member according to some embodiments of the instant disclosure.

In some embodiments, the pressing member 5 has an extension portion 57. The extension portion 57 is between the pressing portion 52 and the mating portion 51. The extension portion 57 may be a single plate member (as shown in FIG. 6) or a plurality of plate members (as shown in FIG. 7).

Figure 8:
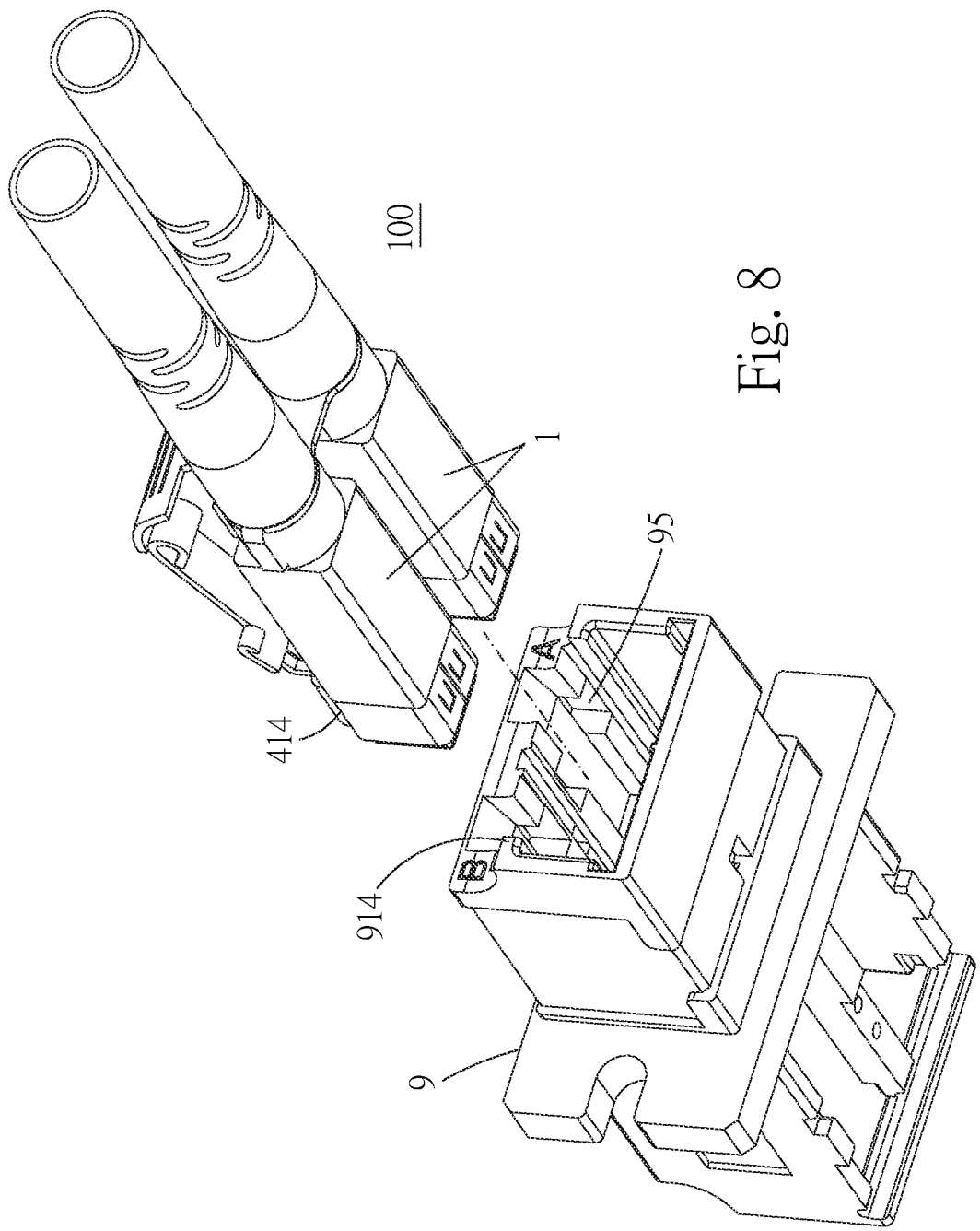
FIG. 8 illustrates an exploded view showing the optical-fiber connector and an adapter according to some embodiments of the instant disclosure.

Please refer to FIG. 5 and FIG. 8. FIG. 8 illustrates an exploded view showing the optical-fiber connector 100 and an adapter 9. In some embodiments, each of two sides of the frame body 41 has a recessed portion 414, and each of the recessed portions 414 corresponds to a protrusion 914 on a corresponding one of two inner sides of the adapter 9.

Please refer to FIG. 9. In some embodiments, when the pressing portion 52 of the pressing member 5 is at a pressing position P1, the rear end of the elastic arm 42 is pushed downwardly by the pressing portion 52, so that the elastic arm 42 drives the retaining structure 44 to move downwardly and inside the adapter 9.

Please refer to FIG. 9. In some embodiments, each of the two sides of the elastic arm 42 has a limiting portion 421 adjacent to the outer wall of the coupling member 1. When the pressing portion 52 of the pressing member 5 is at the pressing position P1, each of the limiting portions 421 leans against the outer wall of the coupling member 1. Therefore, the distance of the downward movement of the elastic arm 42 can be limited within a certain value. Hence, the elastic arm 42 can be prevented from being pressed excessively and deformed, so that the elastic arm 42 can be prevented from providing a sufficient elastic force.

Please refer to FIG. 9. FIG. 9 illustrates a schematic lateral view showing that the optical-fiber connector 100 is mating with the adapter 9. In some embodiments, each of the retaining structures 44 has an arced protrusion 45 (which may also be a cone-shaped protrusion), and the retaining structures 44 extend outwardly from the two sides of the elastic arm 42. After the optical-fiber connector 100 is mated with the adapter 9, an outer arced surface 451 of the arced protrusion 45 of each of the retaining structures 44 contacts an inner wall of a corresponding one of the two connection slots 95 inside the adapter 9 in a line-contact manner (as shown in FIG. 10, through the line 452). Each of the arced protrusions 45 is firmly buckled with the corresponding connection slot 95, so that the optical-fiber connector 100 can be prevented from detaching off the adapter 9 easily. Moreover, the arced protrusion 45 also increases the structural strength of the metal retaining member 4.

In some embodiments, as shown in FIG. 10, from the cross-sectional view of the arced protrusion 45, the arced protrusion 45 is an arced structure in which the profile of the structure is more than a semicircle (or an ellipse), and such structure increases the structural strength of the arced protrusion 45. In some embodiments, the arced protrusion 45 shown in FIG. 10 is arced toward the coupling member 1 (arced downwardly), but embodiments are not limited thereto. In some embodiments, the arced protrusion 45 shown in FIG. 10 may be arced toward a direction away from the coupling member 1.

Please refer to FIG. 10. FIG. 10 illustrates a schematic lateral view showing that the optical-fiber connector 100 is mated with the adapter 9. In some embodiments, when the pressing portion 52 of the pressing member 5 is at an original position P2, a distance along the height direction is between the rear end of the elastic arm 42 and the outer surface of the coupling member 1, and the pressing portion 52 contacts a top portion of the rear end of the elastic arm 42. Hence, the elastic arm 42 is moved upwardly to its original position due to the resilient force applied to the elastic arm, 42 so that the elastic arm 42 drives the retaining structures 44 to move upwardly. Therefore, the arced protrusions 45 of the retaining structures 44 are buckled with the two connection slots 95 of the adapter 9, so that the optical-fiber connector 100 can be fixed inside the housing of the adapter 9.

Figure 12:
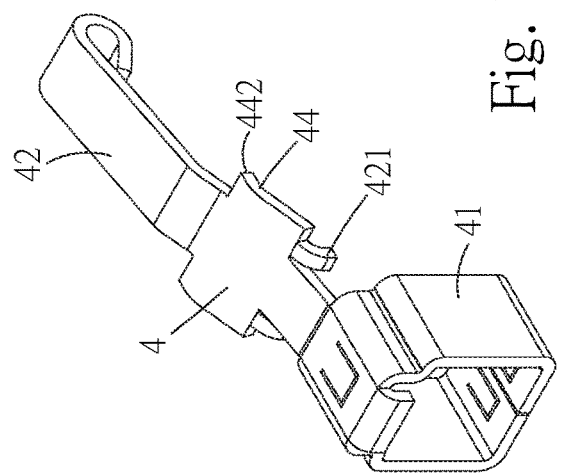
FIG. 12 illustrates a perspective view of a metal retaining member according to some embodiments of the instant disclosure.
Figure 13:
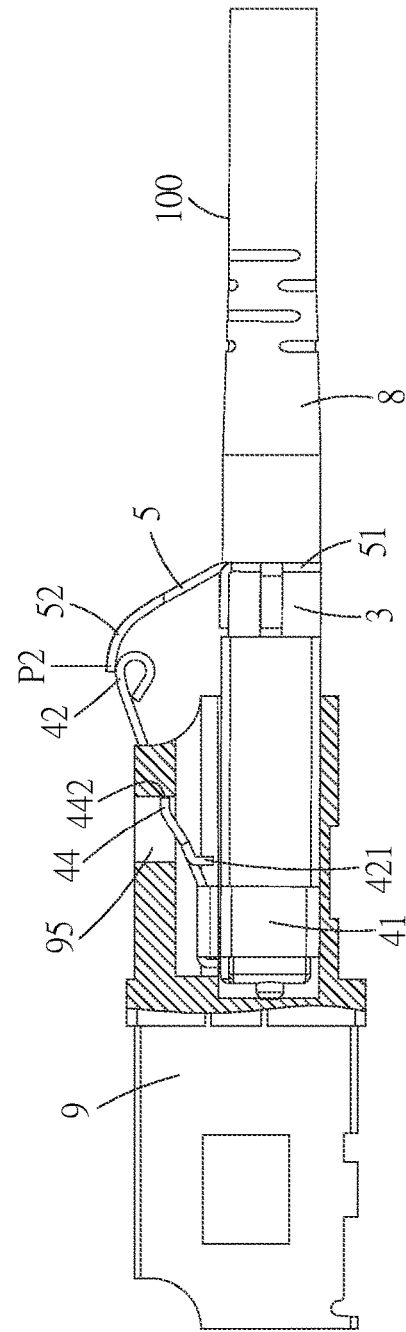
FIG. 13 illustrates a schematic lateral view showing that the optical-fiber connector is mated with the adapter according to some embodiments of the instant disclosure.

Please refer to FIG. 12 and FIG. 13. FIG. 12 illustrates a perspective view of a metal retaining member 4, and FIG. 13 illustrates a schematic lateral view showing that the optical-fiber connector 100 is mated with the adapter 9. In some embodiments, the retaining structures 44 extend outwardly from the two sides of the elastic arm 42. After the optical-fiber connector 100 is mated with the adapter 9, an end surface of each of the retaining structures 44 contacts an inner wall of a corresponding one of the two connection slots 95 inside the adapter 9 in a surface-contact manner (through the surface 422). The end surface of each of the retaining structures 44 is firmly buckled with the corresponding connection slot 95, so that the optical-fiber connector 100 can be prevented from detaching off the adapter 9 easily. Moreover, the retaining structures 44 also increases the structural strength of the metal retaining member 4.

According to some embodiments of the instant disclosure, the optical-fiber connector is buckled with the adapter through the metal retaining member which is made of metal, thereby prolonging the service life of the optical-fiber connector. Moreover, according to some embodiments, the two sides of the elastic arm of the metal retaining member have the arced protrusion, thus increasing the structural strength of the metal retaining member. Furthermore, according to some embodiments, a limiting portion is on the elastic arm to prevent the elastic arm from being pressed excessively and deformed.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical-fiber connector, comprising:
a coupling member having a receiving space and a plurality of openings, wherein the openings are at two ends of the coupling member and in communication with the receiving space;
a core component in the receiving space;
a sleeve member connected to one of the openings;
a metal retaining member having a frame body, wherein the frame body is connected to one of the two ends of the coupling member; the metal retaining member comprises an elastic arm inclinedly extending toward the other end of the coupling member from the frame body, and two sides of the elastic arm have a plurality of retaining structures; and
a pressing member having a mating portion and a pressing portion, wherein the mating portion is fitted over the sleeve member, and the pressing portion extends toward the elastic arm from the mating portion.

2. The optical-fiber connector according to claim 1, wherein the retaining structures extend outwardly from the two sides of the elastic arm, and each of the retaining structures is adapted to contact an inner wall of a corresponding one of two connection slots inside an adapter in a surface-contact manner.

3. The optical-fiber connector according to claim 1, wherein each of the retaining structures has an arced protrusion, and an outer arced surface of each of the arced protrusions is adapted to contact an inner wall of a corresponding one of two connection slots inside an adapter in a line-contact manner.

4. The optical-fiber connector according to claim 1, wherein each of the two sides of the elastic arm has a limiting portion adjacent to an outer wall of the coupling member; when the pressing portion of the pressing member is at a pressing position, each of the limiting portions leans against the outer wall of the coupling member.

5. The optical-fiber connector according to claim 1, wherein the pressing member has a plurality of friction portions adapted to be contacted by a hand; the friction portions are on the pressing portion, the pressing portion contacts a top portion of the elastic arm, and the pressing member has an extension portion between the pressing portion and the mating portion.

6. The optical-fiber connector according to claim 1, wherein the frame body has a plurality of buckling portions and a fixation block, an outer wall of the coupling member has a plurality of engaging portions, each of the buckling portions is buckled with a corresponding one of the engaging portions, and the fixation block is limited at the outer wall of the coupling member.

7. The optical-fiber connector according to claim 1, wherein each of two sides of the frame body has a recessed portion, and each of the recessed portions corresponds to a protrusion on a corresponding one of two inner sides of an adapter.

8. The optical-fiber connector according to claim 1, wherein the pressing member has a fixation block, the fixation block is on the mating portion, an outer wall of the sleeve member has a fixation slot, and the fixation block is buckled with the fixation slot.

9. The optical-fiber connector according to claim 1, wherein the pressing member has a buckling portion, the buckling portion is on the mating portion, an outer wall of the sleeve member has an engaging portion, and the buckling portion is buckled with the engaging portion.

10. The optical-fiber connector according to claim 1, wherein the mating portion has a buckling hole, each of two sides of an inner wall of the buckling hole has a limiting portion, each of two sides of the sleeve member has a positioning portion, and each of the limiting portions is connected to a corresponding one of the positioning portions.

11. The optical-fiber connector according to claim 1, wherein the coupling member has a connection portion at an inner wall of the receiving space and adjacent to one of the openings, the sleeve member has a joint portion, and the connection portion is connected to the joint portion.

* * * * *